Inventor:
John J. McCabe
By Geo H. Kennedy Jr.
Attorneys

June 16, 1942.  J. J. McCABE  2,286,633
ADJUSTABLE SLOTTING TOOL
Filed June 21, 1939   2 Sheets-Sheet 2

Inventor:
JOHN J. McCABE
By Geo. H. Kennedy Jr.
Attorney

Patented June 16, 1942

2,286,633

UNITED STATES PATENT OFFICE 2,286,633

ADJUSTABLE SLOTTING TOOL

John J. McCabe, Worcester, Mass., assignor to The Heald Machine Company, Worcester, Mass., a corporation of Massachusetts Application June 21, 1939, Serial No. 280,361

14 Claims. (Cl. 90—11)

The present invention relates to a slotting tool and particularly to a tool which may be adjusted for cutting slots of various widths.

In prior devices of this character the tool is made up of a disk having inserted cutters clamped in its periphery and it is frequently difficult and many times impossible to adjust the slotting tool, especially after sharpening, for cutting a slot of exactly the required width. This is especially true where the slot must be of a uniform width within very close limits, in which event it is generally necessary to have a special cutter of the exact width desired. After sharpening of a cutter of this character the width of the slot cut is often changed and the cutter is no longer usable for cutting the original width of slot.

The principal object of the present invention is the provision of a slotting tool or cutter which is adjustable so that the width of the slot cut may be held within very close limits and so that a single cutter is usable for more than one width of slot.

Other and further objects and advantages of the invention will more fully appear from the following detailed description taken in connection with the accompanying drawings, in which—

Like reference characters refer to like parts in the different figures.

Figure 1:
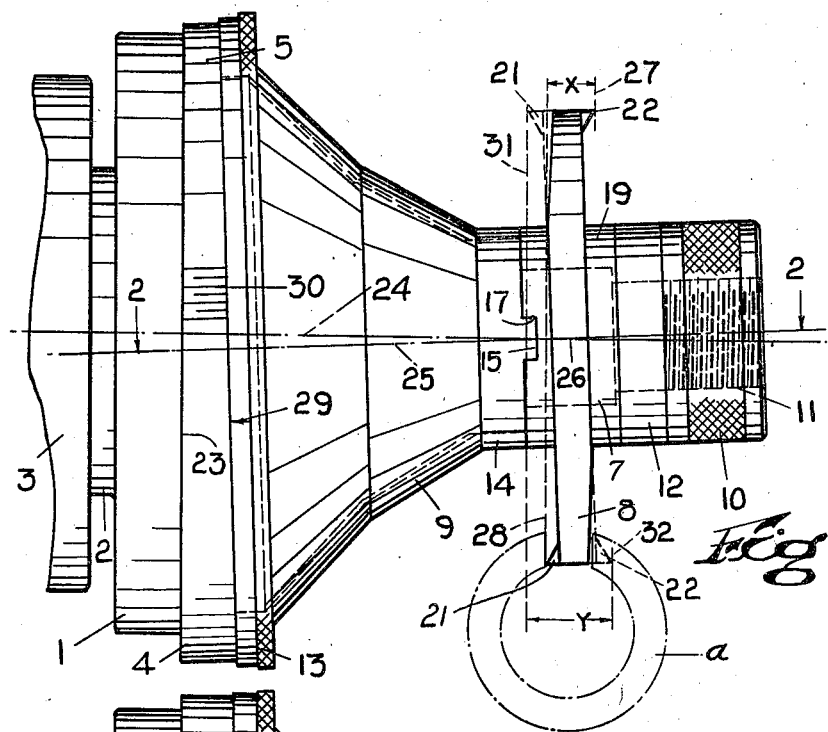
Fig. 1 is a side elevation of a tool embodying the invention.
Figure 2:
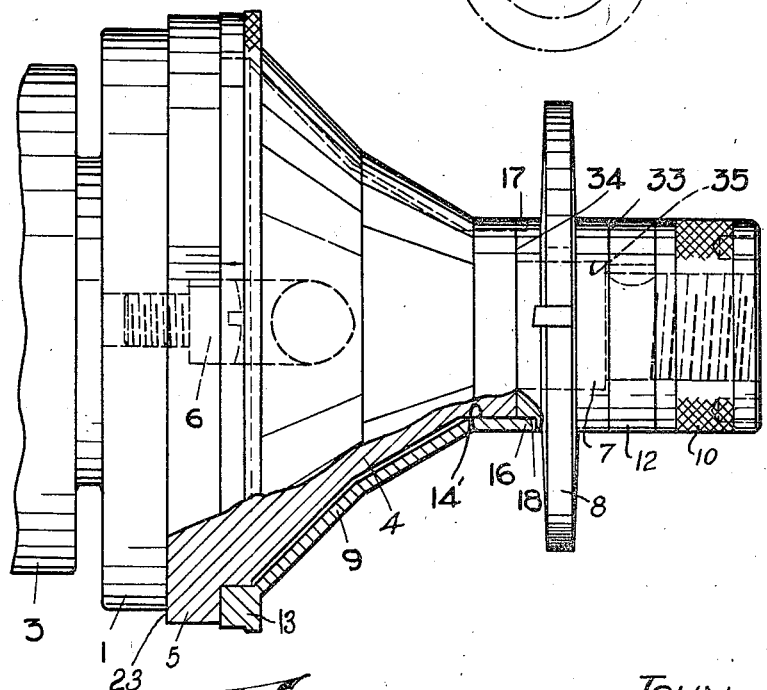
Fig. 2 is a part sectional view of the device of Fig. 1, as seen from below.

As shown in Figs. 1 and 2, the slotting tool of my invention is mounted on a face plate 1 integral with a spindle 2 journalled in a housing 3. The housing and spindle may be of any desired form, as will be apparent.

The slotting tool or cutter 8 is mounted, as shown, on a shaft 7, the latter forming part of a quill 4 which has a flange 5 that is secured, as by bolts 6 to the face plate 1; this attachment of the quill 4 to the face plate 1 disposes the axis of shaft 7 at a slight angle to the axis of spindle 2, as hereinafter more fully described. The cutter 8 has a hub portion 19, by which it is mounted on shaft 7; said hub portion is engaged on its outer end by a collar 12 keyed to shaft 7, and said collar 12 is thrust against the hub 19 by a clamping nut 10 which screws on to the threaded extremity 11 of shaft 7. The tightening of nut 10 thrusts the opposite end of cutter hub 19 against the opposed annular portion 14 of a sleeve 9 that completely surrounds the quill 4, said portion 14 of sleeve 9 having a bearing on a cylindrical portion 14' of said quill. The sleeve 9 terminates inwardly in a large-diameter flange 13, which has a bearing on the flange 5 of quill 4. The annular sleeve portion 14 has diametrically opposite lugs 15 and 16 engaging in slots 17 and 18 in the hub 19 of the cutter. It will be noted that the slots 17 and 18 are of unequal depth so that the cutter 8 is of necessity always located in the same relative position with respect to the sleeve 9 whenever the tool is assembled.

Figure 3:
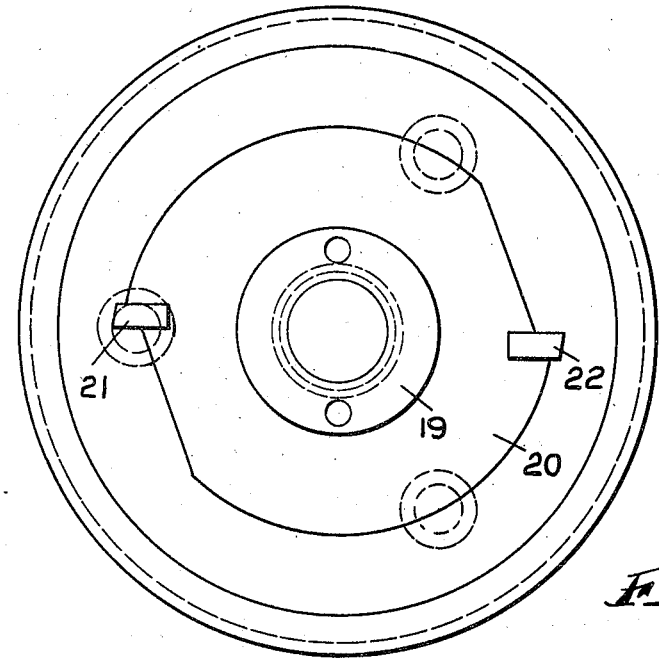
Fig. 3 is an end view of the tool of Fig. 1.

As best shown in Fig. 3, the cutter comprises the hub 19 from which extends a disk 20, whose periphery provides, in angularly spaced relation, a pair of cutting tools 21 and 22, preferably in the form of tool bits of tungsten carbide or other suitable hard cutting material. As shown in Fig. 1, the cutting point of the tool 21 projects from the opposite side of the disk to that from which the cutting point of the tool 22 extends so that the tools operate on opposite walls of the slot being machined.

In order that the cutter may be adjustable for various widths of slots, the quill shaft 7, on which the cutter is angularly adjustable, extends at a slight angle to the axis of rotation 24 of the spindle 2; the axis 25 of quill 4 and its shaft portion 7 is indicated in Fig. 1 by the line 2—2, but it will be understood that in actual practice the angularity between the axes 24 and 25 is by no means as great as that shown in Fig. 1, the angularity having been exaggerated in order to show more clearly the invention. For extreme precision work it has been found desirable to have the axis 25 of the shaft 7 at as small an angle to the axis 24 of the spindle 2 as one-half of one degree, or even less.

In order to make the quill shaft 7 extend at a slight angle to the axis of the spindle 2, the end face 23 of the flange 5 is finished so that it is not precisely at a right angle to the quill axis 25 and the quill is then mounted on the face plate 1 in such a manner that the axis of the spindle 2, represented by the dot-dash line 24, passes substantially through the center of the cutter which is mounted on the shaft 7. The axis of the shaft 7, represented by the dot-dash line 25, intersects the axis of the spindle 2 at the point 26, which, as will be apparent, is substantially at the center of the cutter 8. As above stated, the angularity of the shaft 7 relative to the spindle axis is in reality relatively small and the showing of the drawing is greatly exaggerated.

In operation with the cutter 8 mounted in the full line position of Fig. 1, the cutting points of the tools 21 and 22 describe concentric circles 27 and 28 which are at right angles to the axis of the spindle 2 and spaced apart a distance $x$ representing the minimum width of a slot which may be machined. A workpiece $a$, in which the slot is to be machined, is shown by broken lines in Fig. 1.

In order to vary the width of the slot which the cutter 8 can form, said cutter is adjustable angularly on the shaft portion 7; such adjustment, because of the angularity of shaft 7 to the axis of rotation 24 of said cutter, has the effect of increasing or decreasing, as the case may be, the distance apart of the tools 21 and 22, measured in the direction of the spindle axis 24. For such an adjustment, the clamping nut 19 is loosened, thereby freeing the cutter 8 from the holding action of the collar 12; then, by turning the sleeve 9 on the quill 4 the desired amount of turning movement is imparted to the cutter 8 for a predetermined spacing apart of the cutting points of tools 21 and 22. For this purpose, the flange 13 on sleeve 9 may have an indicating mark 29 for cooperation with graduations 30 on the periphery of the flange 5. If the angle of the shaft 7 is sufficiently small relative to the axis of the spindle 2 these graduations may indicate as small variations in the width of a slot as one ten-thousandth of an inch. From the minimum width position shown by full lines in Fig. 1, an angular adjustment of the cutter 8 through 180° will dispose the tools 21 and 22 in the dotted line positions shown by Fig. 1; in these positions, the cutting points of said tools describe concentric circles 31 and 32 spaced apart by distance $y$, representing the maximum width of a slot which may be machined by the illustrated cutter 8.

One of the principal advantages of this invention is that it permits the use of a standard or conventional "fly-cutter" construction; that is to say, the hub 19 has end faces 33 and 34 which are at right angles to its bore 35, and disk 20 can extend at right angles to the bore 35 and in substantial parallelism to the end faces 33 and 34. It is thus unnecessary to provide for changing of the angularity of any of the surfaces of the cutter in order to obtain slots varying in width.

Figure 4:
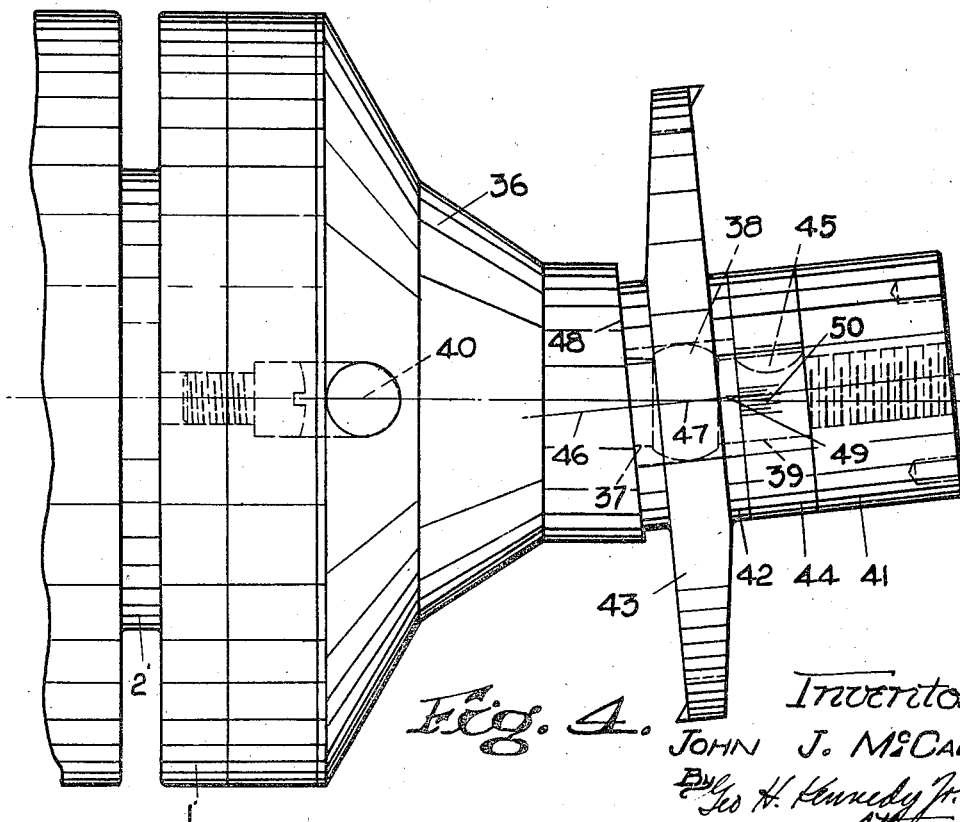
Fig. 4 is a side elevation corresponding to Fig. 1, showing a modification.

With reference now to Fig. 4, which shows a modification, the face plate 1' on the spindle 2' has secured thereto a concentric quill 36 having a stub shaft 37 on which is formed an arcuate bearing surface 38. Beyond the arcuate bearing surface is a shaft portion 39 extending at a slight angle to the axis of the spindle 2' (represented by the dot-dash line 40). The clamping nut 41 is arranged on the threaded end of the shaft 39 and between the nut and the hub 42 of the cutter 43 is located a collar 44 held against rotation on the shaft 39 by a key 45. The axis of the shaft 39 (represented by the dot-dash line 46) intersects the axis of the spindle at a point 47, substantially centrally of the cutter.

The end surface 48 of the quill 36 adjacent to the projecting shaft 37 is arranged at right angles to the axis of the shaft 39 and is thus not precisely at right angles to the axis of the spindle 2'. For adjustment of the width of the slot machined by the cutter, the hub 42 of the cutter has an index mark 49 cooperating with graduations 50 on the collar 44. A relative turning of the cutter on the arcuate bearing surface 38 will vary the width of the machined slot, as will be apparent. It will be understood that the relative angularity of the axes 40 and 46 in this arrangement is greatly exaggerated as the axis of the shaft 39 would normally be less than one degree out of parallel relation to the axis of the spindle 2', where the device is intended for precision slotting.

The device of Fig. 4 is entirely satisfactory in operation and has certain advantages over the arrangement of Figs. 1 to 3, in that it requires fewer parts and is accordingly less expensive to manufacture. It will be noted, however, that the graduations by which the amount of adjustment of the cutter may be determined are located on a surface of relatively small diameter and the graduations must of necessity be more closely spaced than when they are located on a surface of large diameter, as in Fig. 1. It is possible, as above stated, with the arrangement shown in Fig. 1, to have the graduations on the surface of the flange 5 represent such a small variation in slot width as one ten-thousandth of an inch, especially where the angularity of the shaft 7 relative to the spindle axis is relatively small.

The effect in both cases of the cutter's angular movement on an axis that crosses the axis of rotation is to adjust the cutting elements of the tool about the center of rotation of the cutter in a direction parallel to the axis of rotation of the spindle. This adjusting movement will be apparent from either Fig. 1 or Fig. 4; in Fig. 1 for example the cutting element 22 moves in a direction parallel to the axis of the spindle 2 and toward the right as the cutter is turned from the full line position and the cutting element 21 moves toward the left. Thus, by the angular turning of the cutter on the shaft 7, or on the bearing 38, Fig. 4, the effect is that of an angular adjustment of the cutting elements in a plane at right angles to the axis of rotation of the spindle, and about a center coinciding with the center of rotation of the cutter. In this way the space between the parallel circles defined by the cutting points on the cutter may be adjusted for setting the cutter to machine a slot of a predetermined dimension.

In the manufacture of the device of Figs. 1 to 3 the quill may be mounted on centers coinciding with the axis of the shaft 7 and the entire quill is then machined, with all of the surfaces concentric to this axis. The quill is then mounted in a device which will permit an angular adjustment of the quill about an axis at right angles to the axis of the shaft 7 and intersecting the shaft 7 at the point 26 which coincides with the center of rotation of the cutter when mounted on the shaft. The quill is then turned angularly about this axis through an angle corresponding to the desired angle between the axis of the spindle 2 and the axis of the shaft 7, and the surface 23 is then suitably machined so that this surface is out of precise perpendicularity to the axis of the shaft 7 by an amount equal to the amount that the shaft 7 is out of parallel relation to the axis of the spindle 2. The surface 23 thus extends at an angle to the axis of the shaft 7 which is the complement of the desired angle between the axis of rotation of the spindle and the axis of the shaft 7. Obviously, the device may be produced by other methods than the method just outlined.

I claim:

1. In a slotting tool, a rotary spindle, a shaft carried by said spindle and extending at a slight angle to said spindle, a cutter mounted on said shaft and having oppositely projecting cutting elements in angularly spaced relation, means for normally securing the rotation of said cutter with said shaft and said spindle, said cutter being angularly adjustable on said shaft, with the intersection of the spindle axis and shaft axis located substantially centrally of the cutter.

2. In a slotting tool, a cutter having at least two diametrically opposed cutting elements with cutting edges of the opposite elements positioned on opposite sides of the cutter, a rotary spindle on which said cutter is mounted, a member on said spindle having a surface thereon extending slightly out of precise perpendicularity to the axis of rotation of the spindle, and a shaft forming part of said member and extending from said surface at right angles thereto, said cutter being mounted on said shaft and being normally held against rotation with respect to said surface and said cutter being angularly adjustable on said shaft for varying the width of slot machined by the cutter.

3. In a slotting tool, a rotary spindle, a member mounted on said spindle and having a shaft thereon extending at a slight angle to the axis of rotation of the spindle, a cutter having oppositely projecting angularly spaced cutting elements, said cutter being mounted on the shaft for rotation with the member and spindle, the axes of the shaft and spindle intersecting substantially centrally of the cutters, and means for normally holding said cutter against rotation on the shaft, said cutter being angularly adjustable on said shaft to vary the width of the slot machined by the cutter.

4. In a slotting tool, a rotary spindle, a member mounted on said spindle and having a shaft thereon extending at a slight angle to the axis of rotation of the spindle, a cutter having oppositely projecting angularly spaced cutting elements, said cutter being mounted on the shaft for rotation with the member and spindle, the axes of the shaft and spindle intersecting substantially centrally of the cutter, means for normally holding said cutter against rotation on the shaft, said cutter being angularly adjustable on said shaft to vary the width of the slot machined by the cutter, and graduations on one of the parts for indicating the variation in slot width resulting from the angular adjustment of the cutter.

5. In a slotting tool, a rotary spindle, a member mounted on said spindle and having a shaft thereon extending at a slight angle to the axis of rotation of the spindle, a cutter having oppositely projecting angularly spaced cutting elements, said cutter being mounted on the shaft for rotation with the member and spindle, the axes of the shaft and spindle intersecting substantially centrally of the cutter, and a clamping nut for holding said cutter against rotation with respect to the member said nut being releasable to permit adjustment of the cutter angularly with respect to the member.

6. In a slotting tool, a rotary spindle, a member mounted on said spindle, a cutter having oppositely projecting angularly spaced cutting elements, said cutter being mounted on said member, said member having a surface extending out of precise perpendicularity to the axis of rotation of the spindle against which surface the cutter is positioned, a shaft projecting from said surface at right angles thereto on which the cutter is mounted, the axes of the spindle and shaft intersecting substantially centrally of the cutter, and means for holding said cutter against rotation with respect to the member and shaft, said holding means being releasable to permit adjustment of the cutter angularly of the member, thereby adjusting the spacing of the surfaces of revolution defined by the cutting edges of the opposed cutting elements as the spindle rotates.

7. In a slotting tool, a rotary spindle, a quill mounted on the spindle, a shaft on said quill, a cutter having oppositely projecting angularly spaced cutting elements, said cutter being mounted on said shaft and releasable clamping means for holding the cutter against rotation with respect to the quill, said quill being mounted on the spindle with the axis of the shaft slightly out of parallelism to the axis of the spindle and with said axes intersecting substantially centrally of the cutter, whereby upon adjustment of the cutter on said shaft the width of a slot machined by the opposing cutting elements may be varied.

8. In a slotting tool, a rotary spindle, a quill mounted on the spindle, a shaft on said quill, a cutter having oppositely projecting angularly spaced cutting elements, said cutter being mounted on said shaft and releasable clamping means for holding the cutter against rotation with respect to the quill, said quill being mounted on the spindle with the axis of the shaft slightly out of parallelism to the axis of the spindle and with said axes intersecting substantially centrally of the cutter, and a cap extending over said quill and engageable with the cutter for angular turning of the cutter by turning of the cap with respect to the quill, said cap having a peripheral edge of substantial diameter for easy adjustment of the cap and cutter.

9. In a slotting tool, a rotary spindle, a quill mounted on the spindle, a shaft on said quill, a cutter having oppositely projecting angularly spaced cutting elements, said cutter being mounted on said shaft and releasable clamping means for holding the cutter against rotation with respect to the quill, said quill being mounted on the spindle with the axis of the shaft slightly out of parallelism to the axis of the spindle and with said axes intersecting substantially centrally of the cutter, and a cap extending over said quill and engageable with the cutter for angular turning of the cutter by turning of the cap with respect to the quill, said cap and quill having cooperating peripheral portions of substantial diameter, said portions having indicia for indicating the variation in slot width resulting from angular adjustment of the cutter with respect to the quill.

10. In a slotting tool, a rotary spindle having a face plate thereon, a quill having an integral shaft mounted on the face plate, a cutter having oppositely projecting angularly spaced cutting elements, said cutter being mounted on said shaft and releasable means for clamping the cutter against rotation with respect to the quill, the surface of the quill engageable with the face plate being out of precise perpendicularity to the axis of the shaft to position said shaft at a slight angle to the axis of rotation of the spindle, the axes of the shaft and spindle intersecting substantially at the center of the cutter.

11. In a slotting tool, a rotary spindle having a face plate thereon, a quill having an integral shaft mounted on the face plate, a cutter mounted on said shaft and releasable means for clamping the cutter against rotation with respect to the quill, the surface of the quill engageable with the face plate being out of precise perpendicularity to the axis of the shaft to position said shaft at a slight angle to the axis of rotation of the spindle, the axes of the shaft and spindle intersecting substantially at the center of the cutter, a cap extending over the quill and engaging with the cutter to provide for turning of the cutter with said cap and cooperating indicia on the periphery of the quill and cap for indicating the relative angular adjustment between the quill and cap by which to vary the width of the slot machined by the cutter.

12. In a slotting tool, a rotary spindle having a face plate thereon, a quill having an integral shaft mounted on the face plate, a cutter mounted on said shaft, and having oppositely projecting cutting elements in angularly spaced relation, releasable means for clamping the cutter against rotation with respect to the quill, the surface of the quill engageable with the face plate being out of precise perpendicularity to the axis of the shaft, to position said shaft at a slight angle to the axis of rotation of the spindle, the axes of the shaft and spindle intersecting substantially centrally of the cutter, and a sleeve extending over the quill and engaging with the cutter to provide for turning of the cutter with said sleeve, said quill having a peripheral portion of substantial diameter, said sleeve closely fitting the quill adjacent said peripheral portion, thereby providing a portion on the sleeve of substantial diameter by which to turn the cutter on the shaft when adjusting the effective width of said cutter.

13. In a slotting tool, a rotary spindle, a member mounted on said spindle and having a shaft thereon extending at a slight angle to the axis of rotation of the spindle, a cutter having oppositely projecting cutting elements in angularly spaced relation, and a hub with a central bore adapted to receive the shaft, the latter being engageable with the bore of the cutter, said shaft having integral therewith a surface precisely perpendicular to said shaft against which one end of the hub of the cutter engages, and clamping means for holding said cutter against said surface on said shaft, said clamping means being releasable to provide for turning of the cutter on the shaft, thereby adjusting the width of a slot machined by the oppositely projecting elements of the cutter.

14. In a slotting tool, a rotary spindle, a cutter carried by said spindle and having cutting elements angularly spaced apart and projecting from opposite sides thereof, and means for angularly adjusting said cutter on said spindle about an axis which crosses the spindle axis at substantially the center of said cutter, whereby to vary the width of the slot cut by said cutting elements.

JOHN J. McCABE.